Patented Sept. 15, 1953

2,651,883

UNITED STATES PATENT OFFICE 2,651,883

PELLETED SEED PRODUCT

Ross M. Hedrick and David T. Mowry, Dayton, Ohio, assignors to Monsanto Chemical Company, St. Louis, Mo., a corporation of Delaware No Drawing. Application June 26, 1952, Serial No. 295,846

The portion of the term of the patent subsequent to January 13, 1970, has been disclaimed and dedicated to the public 15 Claims. (Cl. 47—1)

This invention relates to new and improved processed seeds, and more specifically to seeds coated for the facilitation of planting operations, for increase in germination of the seeds, and for enhanced growth characteristics of the plant.

Seed coating is well-known in the agricultural arts, and the adaptability of the coated seeds to mechanical planting machines and the incident economies of time and labor are well-known. Seeds are customarily coated with clays having natural adhesive properties, for example, montmorillonite and other bentonitic expanding lattice clays, but such coatings are known to retard the rate of germination and to reduce the proportion of ultimate seed germination. It is also well-known that the clays or other coating compositions may be structurally reinforced by using various resinous adhesives or binders. Although water-soluble adhesives have been used heretofore, for example alginic acid, these are not long-lived in the soil, but are subject to decomposition by soil bacteria. Thus many of the seed coating benefits may be lost prior to the germination of the seed or the emergence of the seedling.

In copending applications, Serial Nos. 148,521 and 148,522, filed March 8, 1950, by Ross M. Hedrick and David T. Mowry, now abandoned, there are described and claimed methods of treating the soil with hydrophilic acrylic acid polymers, and hydrophilic maleic acid copolymers which induce a structure improvement in soils by elimination of the fine soil particles and the agglomeration of the fine particles into crumbs or aggregates which have greatly improved water-stability. The treated soils so prepared are of much more enduring aggregated state and provide increased aeration, increased moisture retention, and enhanced nutrient utilization and other benefits usually experienced in fertile soils. The benefits described in the copending applications are especially noticeable in clay soils of poor structure and low organic content, although the more permanent water-stability will result from the treatment of even the most fertile soil in which the normal aggregation is short-lived.

In copending application, Serial No. 271,280, filed February 12, 1952, by Ross M. Hedrick and David T. Mowry, now issued as United States Patent No. 2,625,529, there is described a large class of synthetic polyelectrolytes which manifest similar improvements when used in treating surface soils. All of these are water-soluble polyelectrolytes having a substantially continuous carbon chain derived by the polymerization of an aliphatic unsaturated carbon to carbon linkage and which are all substantially high molecular weight, for example weight average molecular weights in excess of 10,000. The continuous carbon chain of these useful polymers is that derived by usual olefinic polymerization of double bonded carbon atoms which may be branched but should not contain a large number of cross-linking structures. By "water-soluble" as used in the definition of the class of useful polymers, compounds soluble in distilled water or in the soil water are included, as also are the polymers which swell in the presence of water and in the swollen form are dispersed in the aqueous media.

The present application is a continuation-in-part of said applications, Serial Nos. 148,521 and 148,522 and 271,280.

It has been found that the water-soluble synthetic polyelectrolytes described in the said applications of which this is a continuation-in-part, may be used as the resinous binders for coating compositions in the manner known to the art, but that certain inherent benefits are derived which are not common with respect to compositions used heretofore. By using one of the polyelectrolytes in the seed coating composition, it is possible to modify the structure of the soil in the vicinity of the planted seed, and the seed germination, seedling emergence, root growth and general welfare of the resulting plant will be substantially improved.

Although a wide variety of the synthetic polyelectrolytes are described in the said copending application, Serial No. 271,280, of greatest importance are those which provide optimum effect on the soil, and which are prepared from relatively available and inexpensive raw materials. Of particular importance in the use as seed coating materials are the various acid, alkali metal or lime hydrolyzed polyacrylonitriles and other polymeric acrylic acids and salts thereof, polymethacrylic acid and various salts of the polymeric methacrylic acids, which may be prepared by polymerization of methacrylic acid or by the hydrolysis of polymethacrylonitrile, the sulfonated polystyrenes and salts thereof, copolymers of maleic acid and other copolymerizable monomers, and the various salts thereof, especially the sodium, potassium, ammonium and calcium salts of the copolymer of maleic acid and vinyl acetate, the alkali metal and ammonium salts of the copolymer of maleic acid and isobutylene, the half amide-half ammonium salt of the copolymer of maleic acid and isobutylene, the partial calcium salt of the copolymer of vinyl acetate and the partial methyl ester of maleic acid and homologous copolymers and salts.

The new pelleted seed products are prepared by methods directly analogous to those of the prior art. The seed is placed in a drum revolving on a horizontal axis, thereafter being slightly moistened by an aqueous mist or vapor. The finely divided polymer, or a mixture of polymer and other compound, is blown into the drum and deposited on the moist surface by the rotary action of the drum. The coating on the seeds increases with time, and by proper control a coat of any desired thickness and weight can be obtained. The tendency of the seed to cohere can be prevented by regulation of the rotary action of the drum. The period of time and the thickness of the coat will depend upon the size and the shape of the original seed and the purpose for which the coating is applied. In processing small seeds it is generally desirable to use a coating of substantial thickness so that the coated seed product will be approximately the diameter of larger seeds usually planted by standard automatic machinery. With larger seeds and those of substantially spherical shape the coating will be thinner and may depend more upon the quantity of polymer or other coating composition ingredient desired.

Through the use of polymeric water-soluble polyelectrolytes of the type described herein all of the required adhesive and bonding actions are achieved, but in addition the polymer is available at the site of the planted seed to benefit the seed germination and growth of the plant. If the proportion of the polymer is substantial, the soil water in which it will ultimately dissolve, will transmit the polymer from the pelleted seed product to the adjacent soil whereby the soil aggregates will be stabilized and rendered resistant to the usual slaking and erosion actions. The soil so treated will contain interstices providing air access and beneficial drainage characteristic to the soil. In this manner a single planting operation will provide structural improvement in the soil at the site of the seed where these benefits are most urgently required. The better aeration will also provide optimum conditions for maximum germination, and after germination will provide a porous root bed and a soil of improved water retention and fertility, even in heavy clay soils of normally poor physical structure.

The composition of the coating composition will depend upon the intended use of the pelleted seed product. When resinous binders or adhesives are not used, it is necessary that the base composition be a substance with natural adhesive properties. However, when the polyelectrolytes are used, a wide variety of base compositions may be used, for example clay, sand, diatomaceous earth, flyash, chalk and crushed limestone. The proportions of polymer and filler will vary widely depending upon the physical properties of both. Some of the polymeric polyelectrolytes are very hygroscopic and have greater powers of adherence than others. Similarly the various fillers differ in physical properties and some may require more adhesive than others. The particular combination of polyelectrolyte and filler can readily be determined by one skilled in the art, but in general a composition of from one to 50 per cent polymer will be satisfactory for most applications.

The pelleted seed compositions may include other compounds to provide additional beneficial results. For example, if the seed pellets are to be used in soil deficient in plant nutrients, then it is often desirable to include in the pellet a suitable fertilizer compound. Thus, the principal nutrient elements, nitrogen, phosphorus and potassium or mixtures thereof may be included. Similarly the essential trace elements such as boron, manganese, molybdenum, cobalt and iron may be included. In general the fertilizing components in which the soil is deficient should be supplied. Similarly organic fertilizers may be compounded with the polymer and used as the coating compositions. Since the polyelectrolytes may react with said nutrient compounds or otherwise be adsorbed, they often provide a source of nutrient value over a longer period of time.

Since many types of seeds, and particularly in certain areas, are subject to fungus attack, it is often desirable to include a fungicide. The particular fungicide used will depend upon the suspected fungus, which is most frequently encountered with the particular seed being processed. Thus, bordeaux mixture and other copper containing compounds, mercury, salts, formaldehyde and sulfur may be used effectively. The selection of an effective fungicide will be understood by one skilled in the art.

The pelleted seed compositions may also include an insecticide. Since many seedlings are subject to attack by cutworms and other insect larvae in the ground, a suitable effective insecticide or insect repellent may be used, for example dichlorodiphenyltrichloroethane, arsenic derivatives, organic sulfur compounds and nicotine or other alkaloid derivative.

The use of other compositions, for example indolacetic acid or other growth promoting hormones, germination stimulants, and other additives may be required in particular circumstances. The selection and addition of functional additives is well-understood by one skilled in the art. Obviously compounds which in addition to beneficial effects have deleterious effects on the seeds should be avoided.

What we claim is:

1. A pelleted seed product comprising a seed having adhered thereto a composition including a polymeric water-soluble polyelectrolyte having a weight average molecular weight of at least 10,000, and having a structure derived by the polymerization of a monoolefinic compound through the aliphatic unsaturated group.

2. A pelleted seed product comprising a seed having adhered thereto a synthetic water-soluble polyelectrolyte having a structure derived by the polymerization of a monoolefinic compound through aliphatic carbon to carbon unsaturation and having a molecular weight such as to improve the water-stability of soil aggregates.

3. A pelleted seed product comprising a seed having a coating of a composition including a polymeric water-soluble polyelectrolyte having a weight average molecular weight of at least 15,000, and containing a substantially linear structure derived by the polymerization of an aliphatic unsaturated group.

4. A pelleted seed product comprising a seed having a coating of a composition including a synthetic polyelectrolyte containing a substantially linear structure derived by the polymerization of a compound through aliphatic carbon to carbon unsaturation and having a molecular weight such as to improve the water-stability of soil aggregates.

5. A pelleted seed product comprising a seed having adhered thereto a composition including a polymeric water-soluble polyelectrolyte having a weight average molecular weight of at least 10,000, said polymer being selected from the class consisting of: polymers of acrylic acid, salts of polymers of acrylic acid, salts of hydrolyzed polymers of acrylonitrile, hydrolyzed polymers of acrylonitrile, polymers of methacrylic acid, salts of polymers of methacrylic acid, salts of hydrolyzed polymers of methacrylonitrile, hydrolyzed polymers of methacrylonitrile, salts of copolymers of unsaturated polycarboxylic acids and at least one other monoolefinic monomer, copolymers of unsaturated polycarboxylic acids and at least one other monoolefinic monomer, salts of hydrolyzed copolymers of unsaturated polycarboxylic acid anhydrides and at least one other monoolefinic monomer, hydrolyzed copolymers of unsaturated polycarboxylic acid anhydrides and at least one other monoolefinic monomer, salts of copolymers of the partial alkyl esters of unsaturated polycarboxylic acids and at least one other monoolefinic monomer, copolymers of the partial alkyl esters of unsaturated polycarboxylic acids and at least one other monoolefinic monomer, salts of sulfonated polymers of hydrocarbons containing aliphatic unsaturation, sulfonated polymers of hydrocarbons containing aliphatic unsaturation, polymers of amines containing aliphatic unsaturation, and polymers of amides containing aliphatic unsaturation.

6. The product defined by claim 1 wherein the polyelectrolyte is a calcium salt of a hydrolyzed polymer of acrylonitrile.

7. The product defined by claim 1 wherein the polyelectrolyte is a sodium salt of a hydrolyzed polymer of acrylonitrile.

8. The product defined by claim 1 wherein the polyelectrolyte is a copolymer of vinylacetate and the reaction product formed by partially esterifying maleic anhydride with methyl alcohol.

9. The product defined by claim 1 wherein the polyelectrolyte is an ammonium salt of the copolymer of isobutylene and maleic acid.

10. The product defined by claim 1 wherein the polyelectrolyte is a calcium salt of the copolymer of vinyl acetate and maleic anhydride.

11. The product defined by claim 2 wherein the polyelectrolyte is a calcium salt of a hydrolyzed polymer of acrylonitrile.

12. The product defined by claim 2 wherein the polyelectrolyte is a sodium salt of a hydrolyzed polymer of acrylonitrile.

13. The product defined by claim 2 wherein the polyelectrolyte is a copolymer of vinylacetate and the reaction product formed by partially esterifying maleic anhydride with methyl alcohol.

14. The product defined by claim 2 wherein the polyelectrolyte is an ammonium salt of the copolymer of isobutylene and maleic acid.

15. The product defined by claim 2 wherein the polyelectrolyte is a calcium salt of the copolymer of vinyl acetate and maleic anhydride.

ROSS M. HEDRICK.
DAVID T. MOWRY.

References Cited in the file of this patent

UNITED STATES PATENTS

| Number | Name | Date |
|---|---|---|
| 79,765 | Lafferty | July 7, 1868 |
| 1,319,157 | Lingle | Oct. 21, 1919 |
| 2,553,577 | Hale | May 22, 1951 |
| 2,579,734 | Burgesser | Dec. 25, 1951 |
| 2,579,735 | Burgesser | Dec. 25, 1951 |
| 2,582,194 | Dudley | Jan. 8, 1952 |
| 2,625,529 | Hedrick | Jan. 13, 1953 |
| 2,625,471 | Mowry | Jan. 13, 1953 |